(12) United States Patent
Kohara (10) Patent No.: US 10,189,317 B2
(45) Date of Patent: Jan. 29, 2019

(54) PNEUMATIC TIRE HAVING TWISTED BEAD CORDS

(71) Applicant: SUMITOMO RUBBER INDUSTIRES LTD., Kobe-shi, Hyogo (JP)

(72) Inventor: Kei Kohara, Kobe (JP)

(73) Assignee: SUMITOMO RUBBER INDUSTRIES LTD., Kobe-shi, Hyogo (JP)

( * ) Notice: Subject to any disclaimer, the term of this patent is extended or adjusted under 35 U.S.C. 154(b) by 294 days.

(21) Appl. No.: 14/436,758

(22) PCT Filed: Oct. 4, 2013

(86) PCT No.: PCT/JP2013/077132
§ 371 (c)(1),
(2) Date: Apr. 17, 2015

(87) PCT Pub. No.: WO2014/073303
PCT Pub. Date: May 15, 2014

(65) Prior Publication Data
US 2015/0258862 A1    Sep. 17, 2015

(30) Foreign Application Priority Data

Nov. 9, 2012    (JP) ................................. 2012-247715

(51) Int. Cl.
*B60C 15/05*        (2006.01)
*B29D 30/10*        (2006.01)
(Continued)

(52) U.S. Cl.
CPC .............. *B60C 15/05* (2013.01); *B29D 30/10* (2013.01); *B29D 30/18* (2013.01); *B29D 30/48* (2013.01);
(Continued)

(58) Field of Classification Search
CPC ..... B60C 19/00; B60C 5/14; B60C 2005/145; B60C 2005/147; B60C 15/05;
(Continued)

(56) References Cited

U.S. PATENT DOCUMENTS 4,067,375 A * 1/1978 Lejeune ................. B60C 15/05
152/540
2006/0096690 A1    5/2006 Nakata
(Continued)

FOREIGN PATENT DOCUMENTS

EP    2 684 712 A1    1/2014
JP    10-305710 A    11/1998
(Continued)

OTHER PUBLICATIONS

Extended European Search Report, dated Apr. 28, 2016, for European Application No. 13852743.7.
(Continued)

*Primary Examiner* — Robert C Dye
*Assistant Examiner* — Sedef E Paquette
(74) *Attorney, Agent, or Firm* — Birch, Stewart, Kolasch & Birch, LLP (57) ABSTRACT

A pneumatic tire to reduce separation of a carcass ply from inner and outer core pieces (5i, 5o) and improve steering stability. A radially inner end portion of the carcass ply is held between the inner and outer core pieces (5i, 5o) without turning-up around a bead core. The inner and outer core pieces (5i, 5o) are made of helical body of bead cord (10i, 10o) helically winding around a tire axis. In the inner core piece (5i), the final twisting direction of the bead cord (10i) is the same as the winding direction around the tire axis of the bead cord (10i) in side view from axial outward of the
(Continued)

tire. In the outer core piece (5o), the final twisting direction of the bead cord (10o) is opposite to the winding direction of the bead cord (10o).

6 Claims, 12 Drawing Sheets

(51) Int. Cl.
    *B60C 15/04*     (2006.01)
    *B29D 30/48*     (2006.01)
    *B29D 30/18*     (2006.01)
    *B60C 5/12*     (2006.01)
    *B60C 9/02*     (2006.01)
    *B60C 15/00*     (2006.01)
    *B60C 9/04*     (2006.01)

(52) U.S. Cl.
    CPC ............... *B60C 5/12* (2013.01); *B60C 9/02* (2013.01); *B60C 15/0018* (2013.01); *B60C 15/04* (2013.01); *B29D 2030/487* (2013.01); *B60C 2009/0416* (2013.01); *B60C 2015/044* (2013.01)

(58) Field of Classification Search
    CPC . B60C 15/0018; B60C 15/04; B60C 15/0081; B60C 15/0009; B60C 2015/046; B60C 15/00; Y10T 152/10495; B29D 30/48; B21F 37/00
    USPC ......... 152/545, 539, 540, 550; 156/136, 422
    See application file for complete search history.

(56) References Cited

U.S. PATENT DOCUMENTS

| | | | |
|---|---|---|---|
| 2006/0266458 A1* | 11/2006 | Ishikawa | B60C 9/08 152/540 |
| 2007/0266458 A1 | 11/2007 | Lawit et al. | |
| 2008/0066843 A1* | 3/2008 | Alvarez | B60C 9/0007 152/451 |
| 2012/0193010 A1* | 8/2012 | Fukumoto | B29D 30/38 156/84 |

FOREIGN PATENT DOCUMENTS

| | | |
|---|---|---|
| JP | 2006-044339 A | 2/2006 |
| JP | 2006-160236 A | 6/2006 |
| JP | 2006-327318 A | 12/2006 |
| JP | 2010-115957 A | 5/2010 |
| JP | 2012-126299 A | 7/2012 |
| WO | WO 2012/137528 A1 | 10/2012 |

OTHER PUBLICATIONS

International Search Report issued in PCT/JP2013/077132 dated Jan. 7, 2014.

* cited by examiner

Prior Art

FIG.11(B)

Prior Art

PNEUMATIC TIRE HAVING TWISTED BEAD CORDS

TECHNICAL FIELD

The present invention relates to a pneumatic tire and a production method thereof having a bead structure where a radially inner end portion of a carcass ply is held between axially inner and outer core pieces.

BACKGROUND

Figure 11A:
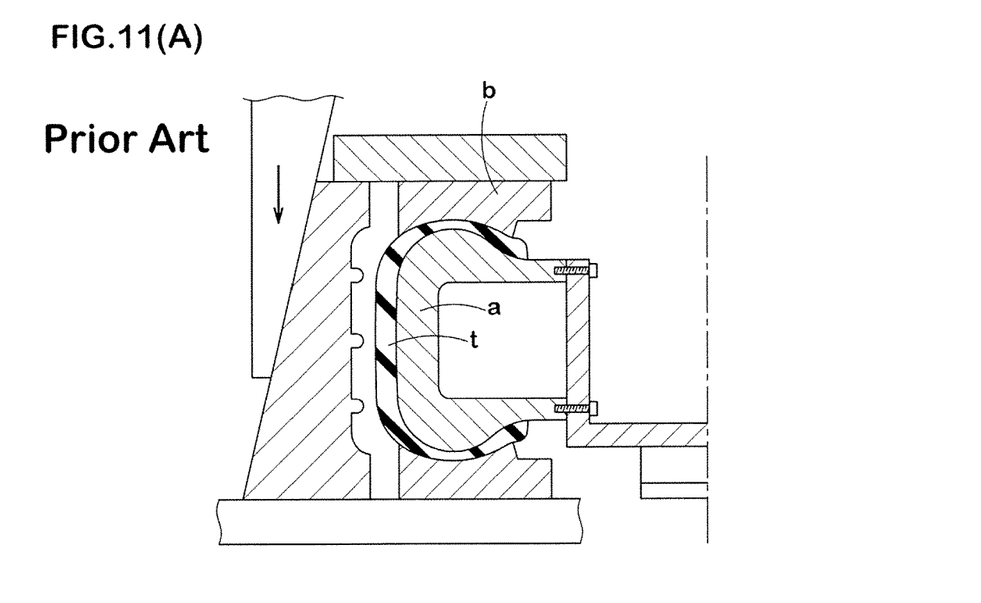

In recent years, as shown in FIG. 11(A), a production method by use of a rigid core (a) having an outer surface configuration being nearly identical to a tire inner surface configuration of a vulcanized tire (hereinafter called "core methods") has been proposed. In this core method, tire components such as an inner liner rubber, a carcass ply, a bead core, a belt ply, a sidewall rubber and a tread rubber are sequentially applied on the rigid core (a). This forms an unvulcanized tire (t). The unvulcanized tire (t) is set in a vulcanization mold (b) with the rigid core (a) and vulcanized between the rigid core (a) as an inner mold and the vulcanization mold (b) as an outer mold.

Figure 11B:
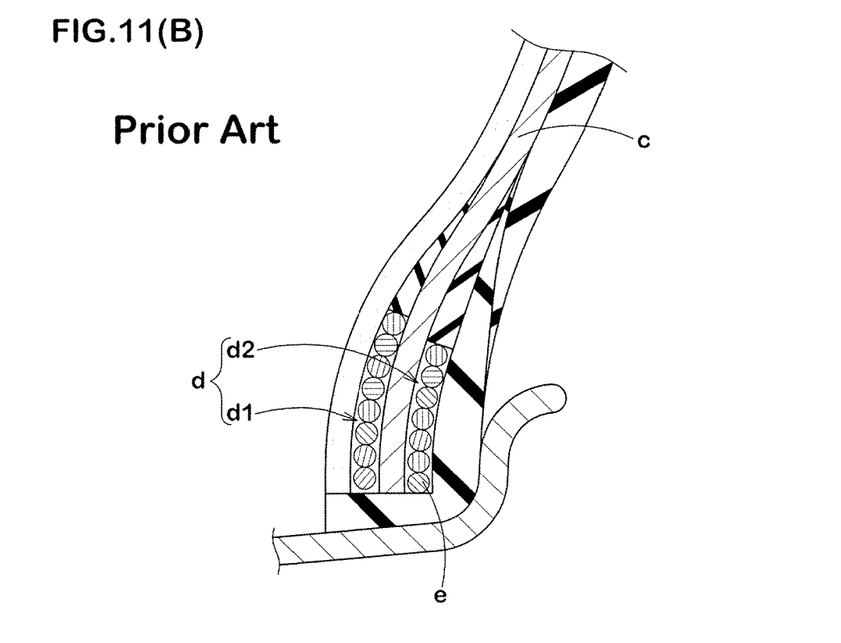

In this core method, it is difficult to employing a structure that both end portions of the carcass ply are turned up around each bead core as a conventional tire. Therefore, the following Patent Document 1 discloses a structure shown in FIG. 11 (B). That is to say, the bead core (d) is divided into axially inner and outer core pieces (d1, d2). And, the both end portions of the carcass ply (c) are held between the inner and outer core pieces (d1, d2). The inner and outer core pieces (d1, d2) are formed as a helical body formed by helically winding a bead cord (steel cord) (e) around the tire axis.

However, in case where the tire was formed in the core method, a survey found that the tension of the carcass cord was not enough, and this possibly reduced steering stability, on the ground of this, during vulcanization, binding force of the bead core (d) to the carcass ply (c) became insufficient, the carcass ply (c) possibly moved from between the core pieces (d1, d2) in the loosing direction (radially outwardly). AS a result, even if the heat shrinkage occurs in the carcass cords during the vulcanization, the tension in the carcass cord direction is not sufficiently applied owing to the movement in the loosing direction.

Figure 12A:
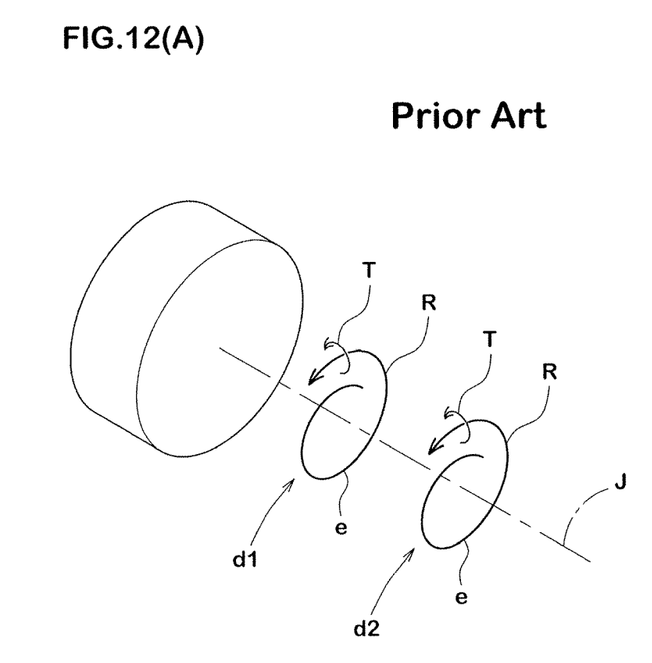
Figure 12B:
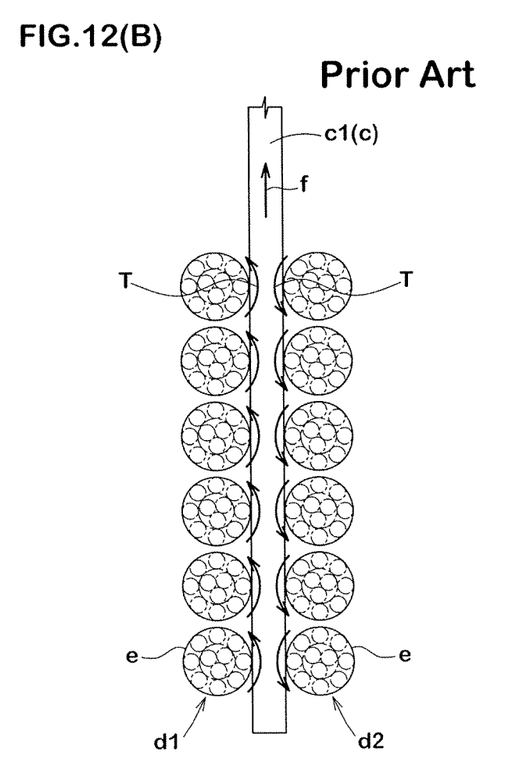

And the results of the inventor's research, it was found that, the twisting direction T of a bead cord (e) and a winding direction R around the tire axis J of the bead cord (e) caused the movement in the loosing direction as shown in FIG. 12 (A). That is, in the conventional core pieces (d1, d2), the winding direction R of the bead cord (e) around the tire axis J was the same, and the bead cord (e) had the same twisting direction T. Therefore, as shown in FIG. 12(B), when the heat shrinkage (f) occurred the carcass cords (c1), in one of the inner and outer core pieces (d1, d2) (the outer core piece d2 in FIG. 12 (B)), the bead cord (e) was rotated in the untwisting direction. Since the steel wire of the cord easily moved in the untwisting direction, the carcass ply (c) easily moved in the heat shrinkage direction, and the tensile force did not subject.

CITATION

Patent Literature

Patent Document 1: Japanese published unexamined application No. 2006-160236

SUMMARY OF THE INVENTION

Problems to be Solved by the Invention

The present invention is grounded in limiting a final twisting direction and a winding direction of the bead cord in inner and outer core pieces and being capable of applying the tension to a carcass card while suppressing the loosing of the carcass cord from the inner and outer core pieces so as to intend to provide a pneumatic tire which can improve steering stability, and a manufacturing method thereof.

Means for Solving the Problems

According to the first invention of the present application, a pneumatic tire comprises a carcass comprising a carcass ply extending from a tread portion through a sidewall portion to a bead core of a bead portion. The bead core is made of an axially inner and outer core pieces, and radially inner end portion of the carcass ply is held between the inner and outer core pieces without turning-up around the bead core. The inner and outer core pieces are formed of a helical body by helically winding a bead cord made of a plurality of twisted steel wires around a tire axis from radially inward to outward. And in the inner core piece, the final twisting direction of the bead cord is the same as the winding direction of the bead cord around the tire axis in a side view from an axial outward of the tire. In the outer core piece, the final twisting direction of the bead cord is opposite to the winding direction of the bead cord around the tire axis in the side view from the axial outward of the tire.

According to the second invention of the present application, a production method for a pneumatic tire comprises a carcass comprising a carcass ply extending from a tread portion through a sidewall portion to a bead core of a bead portion. The production method comprises a green tire forming step of forming a green tire by use of a rigid core having a tire forming surface on the outer surface by sequentially applying unvulcanized tire components including the bead core and the carcass ply on the tire forming surface. The green tire forming step comprises a first core piece step of forming an inner core piece on the tire forming surface by helically winding a bead cord made of a plurality of twisted steel wires around the tire axis from radially inward to outward, a carcass forming step comprising a step of applying a radially inner end portion of the carcass ply to the axially outside surface of the inner core piece, and a second core piece step of forming the outer core piece on the axial outward of the tire of the radially inner end portion of the carcass ply by helically winding the bead cord around the tire axis from radially inward to outward. In the first core piece step, the final twisting direction of the bead cord is the same direction as the winding direction of the bead cord around the tire axis in the side view from the axial outward of the tire. In the second core piece step, the final twisting direction of the bead cord is opposite to the winding direction of the bead cord around the tire axis in the side view from the axial outward of the tire.

Effect of the Invention

In the inner core piece of the present invention, as disclosed above, the final twisting direction of the bead cord is the same as the winding direction of the bead cord around the tire axis in the side view from the axial outward of the tire. In contrast, in the outer core piece, the final twisting direction of the bead cord is opposite to the winding direction of the bead cord around the tire axis in the side view from the axial outward of the tire.

Therefore, when the heat shrinkage occurs in the carcass cord, the bead cords of the inner and outer core pieces are all twisted in the tightening direction. Thus, the binding force in the direction of the heat shrinkage increases, and it is possible to apply the tension to the carcass cord. As a result, the steering stability can be improved.

BRIEF DESCRIPTION OF THE DRAWINGS

FIGS. 5 (A) and (B) are a cross-sectional view and a diagrammatic perspective view showing the bead cord for the inner core piece in this embodiment FIGS. 6 (A) and (B) are a cross-sectional view and a diagrammatic perspective view showing the bead cord for the outer core piece in this embodiment.

FIGS. 9 (A) and (B) are brief cross-sectional views showing an example of a bead structure having a carcass made of a plurality of carcass plies.

FIGS. 10 (A) to (c) are cross-sectional views showing a first core piece step, a carcass forming step, and a second core piece step.

FIGS. 11 (A) is a cross-sectional view explaining a core method, and (B) is a cross-sectional view showing a bead structure to be used in the tire of the core method.

FIGS. 12 (A) is a conceptual diagram showing a core piece of a conventional bead core, and (B) is a cross-sectional view showing problem points thereof.

EMBODIMENTS OF THE INVENTION

Hereinafter, an embodiment of the present invention will be described in detail.

Figure 1:
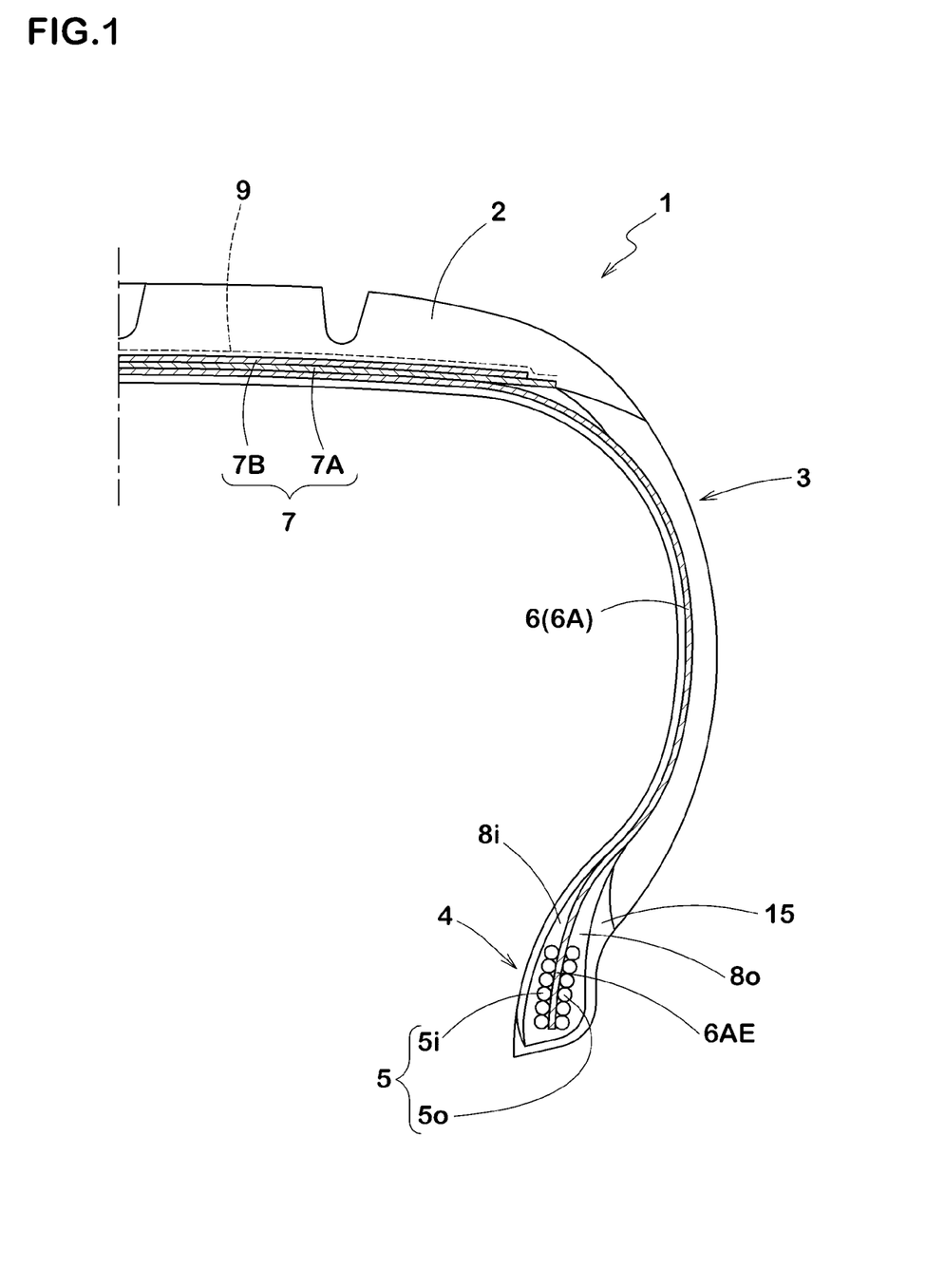
FIG. 1 is a cross-sectional view showing an example of a pneumatic tire according to the present invention.

As shown in FIG. 1, a pneumatic tire 1 according to the present embodiment comprises a carcass 6 extending from a tread portion 2 through a sidewall portion 3 to a bead core 5 of a bead portion 4. in the present embodiment, a belt layer 7 is disposed radially outward of the carcass 6 and inside the tread portion 2.

The belt layer 7 is formed of at least one belt ply, two belt plies 7A, 7B in the present embodiment, where belt cords are arranged at an angle of 10 to 35 degrees with respect to the tire circumferential direction, for example. The belt cords of the belt layer 7 intersect one another between plies. This increases belt rigidity and strongly reinforces the tread portion 2.

In this embodiment, radially outside of the belt layer 7, there is provided a band layer 9 made of a band cord spirally wound with respect to the circumferential direction for improving high-speed durability and the like. For the band layer 9, a pair of edge band plies to cover only the axially outer end portion of the belt layer 7 and a full band ply to cover substantially overall width of the belt layer 7 can be employed. The present embodiment shows a case that the band layer 9 is formed of a single full band ply.

The carcass 6 is formed of at least one carcass ply, one carcass ply 6A in the present embodiment, where an organic fiber carcass cord is arranged at an angle of 70 to 90 degrees with respect to the tire circumferential direction, for example. The carcass ply 6A has a toroidal form extending between the bead portions 4, 4. And the radially inner end portion 6AE of the carcass ply 6A is not turned up around the bead core 5 but is held in the bead cores 5.

Specifically, the bead core 5 is made of axially inner and outer core pieces 5i, 5o. And the radially inner end portion 6AE of the carcass ply 6A is held between the inner and outer core pieces 5i, 5o. The bead portion 4 is provided with inner and outer bead apex rubbers 5i, 5o extending from the inner and outer core pieces 5i, 5o toward the radially outward respectively in a tapered manner, thereby reinforcing between the bead portion 4 and the sidewall portion 3. The sign 15 in drawings means a chafer rubber for preventing rim shifting.

Figure 2:
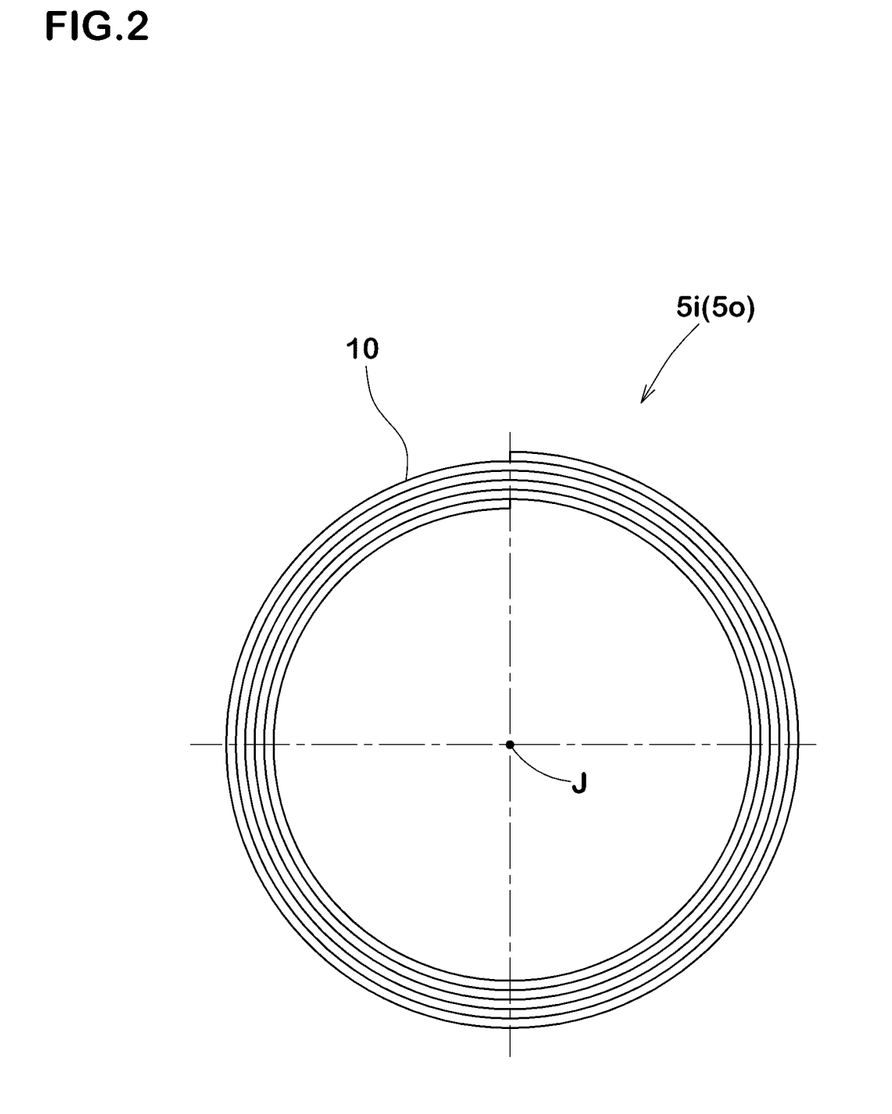
FIG. 2 is a side view showing a core piece of a bead core.

As shown in FIG. 2, the inner and outer core pieces 5i, 5o are formed of a helical body made by helically winding a bead cord 10 from the radially inward to the radially outward around the tire axis J. The present embodiment shows a case that, as shown In FIG. 1, each of the core pieces 5i, 5o forms a line in the tire axial direction. Therefore, within a limited winding number of the bead cord 10, the radial height of the core piece 5i, 5o can be set at a maximum, the area of contact with the carcass ply 6A can be increased, and the locking force to the both end portions 6AE of the carcass ply 6A can be improved. Moreover, upon request, one or both of the core pieces 5i, 5o can be also formed in two lines to improve bead rigidity.

Figure 3:
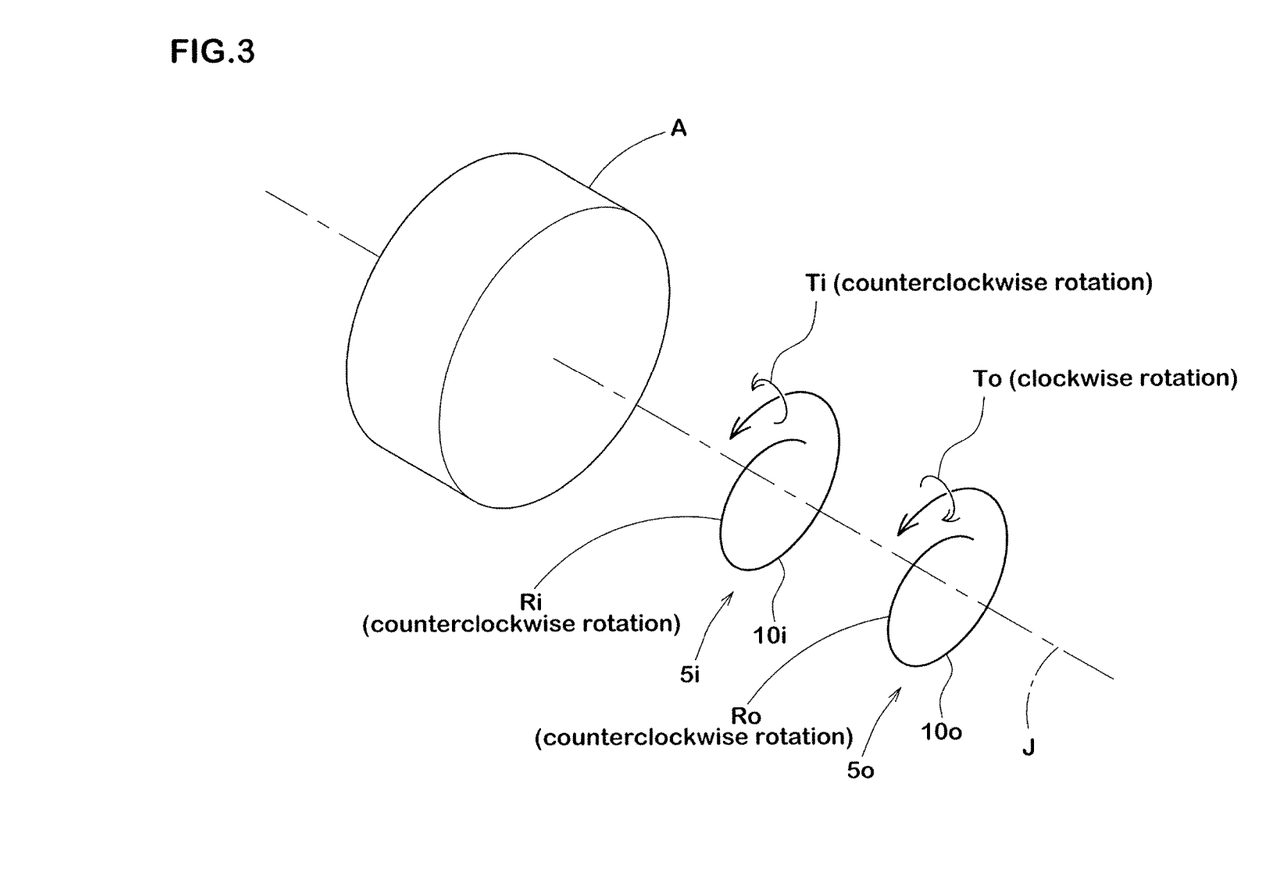
FIG. 3 is a conceptual diagram showing a twisting direction and a winding direction of the bead cord in the inner and outer core pieces.

And in the present invention, as schematically shown in FIG. 3,
(1) in the inner core piece 5i, the final twisting direction Ti of the bead cord 10i is the same as the winding direction Ri of the bead cord 10i around the tire axis J in the side view from the axial outward of the tire, and
(2) in the outer core piece 5o, the final twisting direction To of the bead cord 10o is opposite to the winding direction Ro of the bead cord 10o around the tire axis J in the side view from the axial outward of the tire. In other words, Ti=Ri and To≠Ro.

Figure 4:
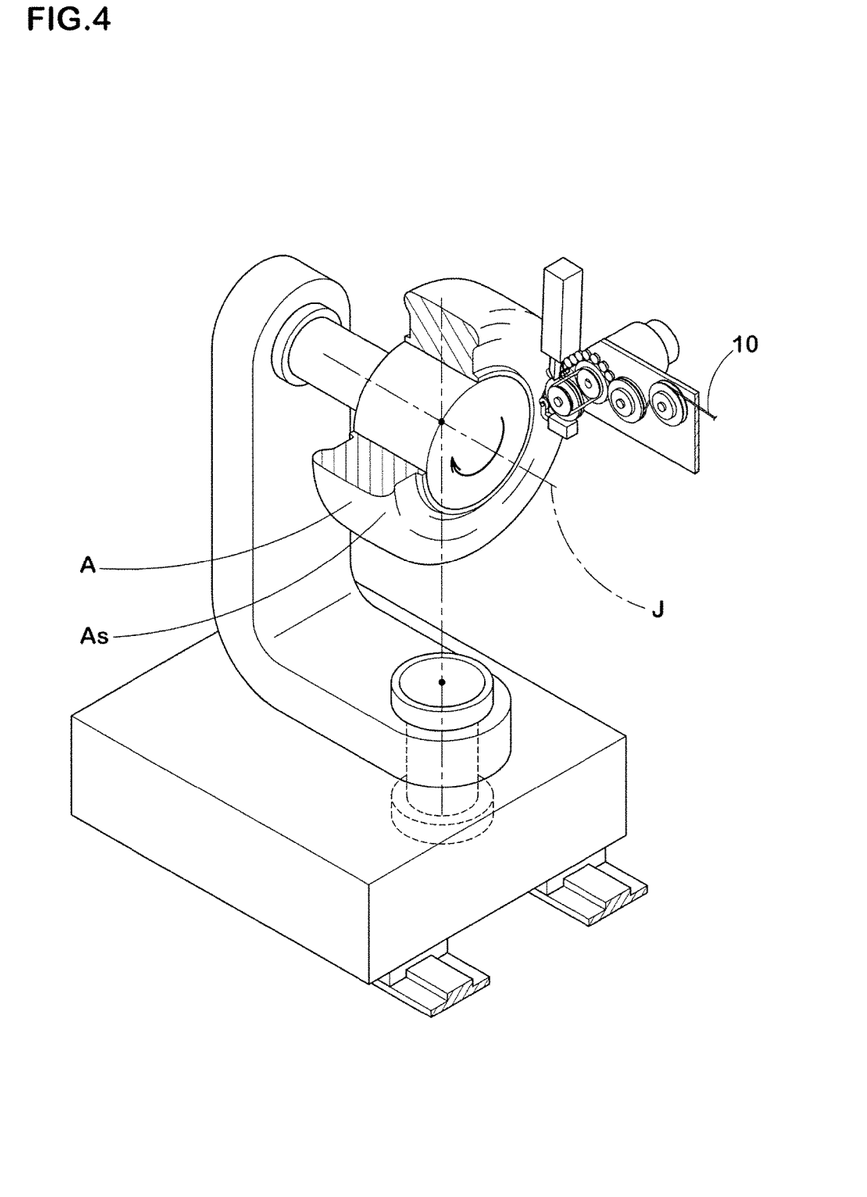
FIG. 4 is a diagrammatic perspective view showing an example of a method of formation of the core piece.

For example, as schematically shown in FIG. 4, each of the respective core pieces 5i, 5o is formed as a helical form by pressing the bead cord 10 against a rotating rigid core (A). Thus, in a normal case, the winding direction Ri of the bead cord 10i in the inner core piece 5i and the winding direction Ro of the bead cord 10o in the outer core piece 5o become the same (Ri=Ro). FIGS. 2 and 3 show a case that each of the winding directions Ri and Ro is "counterclockwise rotation".

Therefore, in the present embodiment, for the inner core piece 5i, a z-twist cord, of which final twisting direction Ti is "counterclockwise rotation" is employed as the bead cord 10i. This final twisting direction Ti is the same direction as the winding direction Ri For the outer core piece 5o, a S-twist cord, of which final twisting direction To is "clockwise rotation", is employed as the bead cord 10o. This final twisting direction To is the opposite direction to the winding direction Ro. in other words, Ti≠To.

Figure 5A:
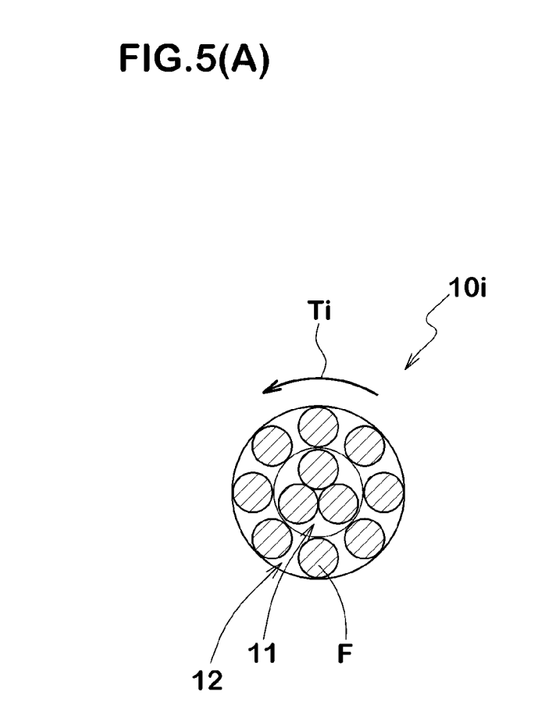
Figure 5B:
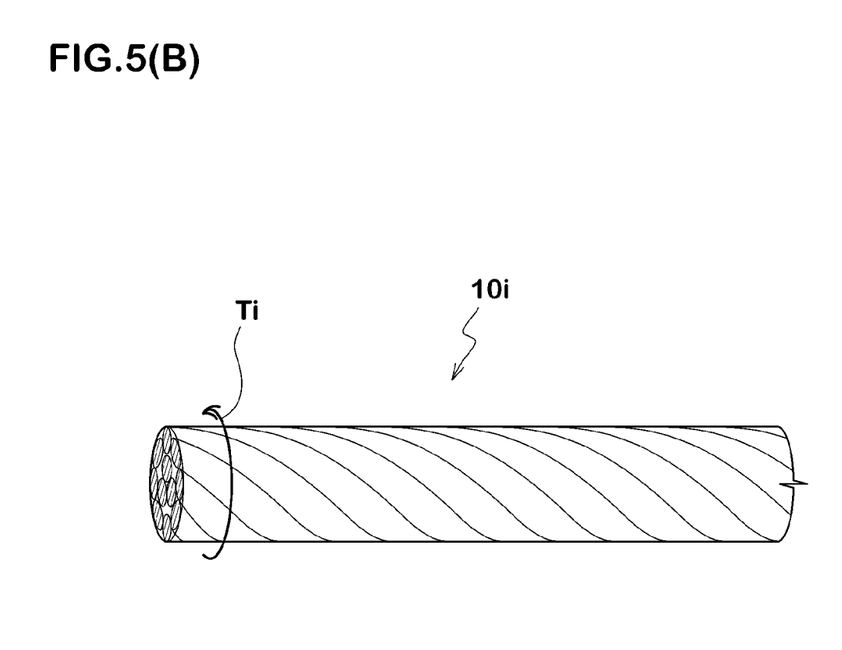

Specifically, the bead cord 10i is, as shown in FIG. 5, made of a plurality of steel wires F by twisting together. In the present embodiment, the bead cord 10i has a layer twisting structure comprising a core 11 made by twisting three steel wires F together, and a sheath 12 made by twisting eight steel wires F together disposed outside thereof. In this time, the twisting direction of the sheath 12 (equivalent to the final twisting direction Ti) is defined as the "counterclockwise rotation" (Z-twist).

Figure 6A:
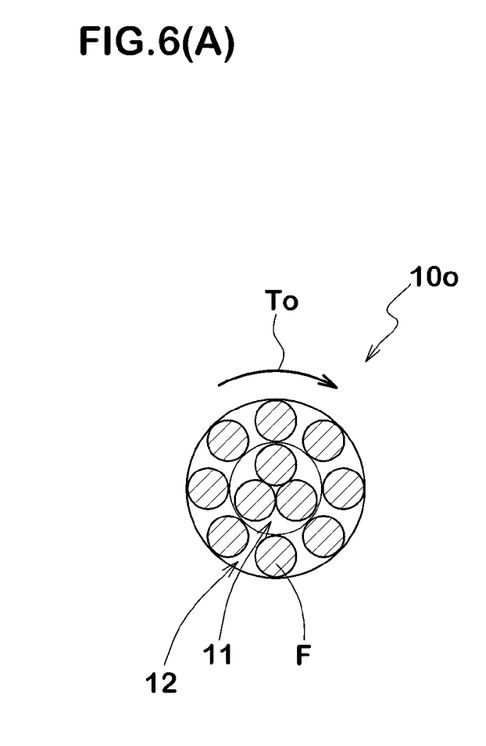
Figure 6B:
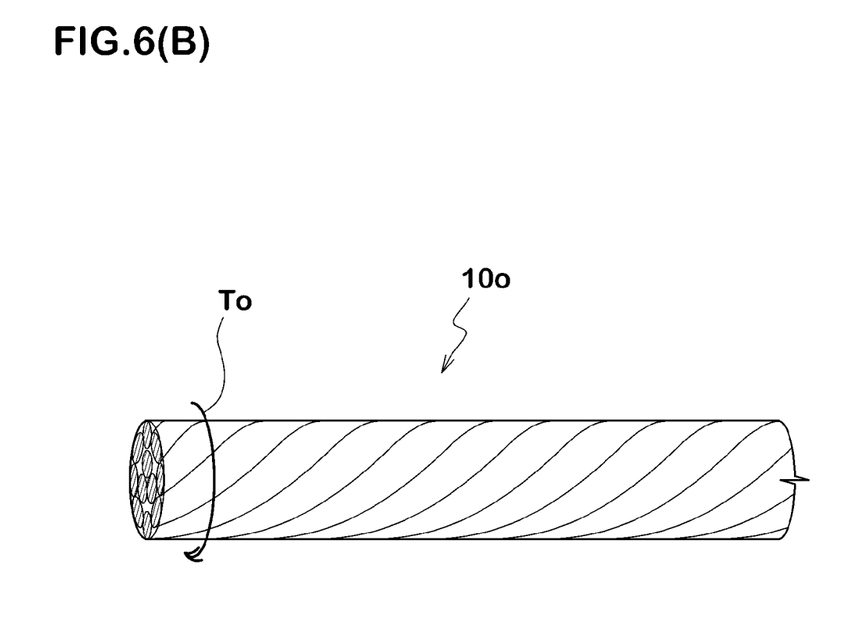

However, the bead cord 10o has, as shown in FIG. 6, the same structure as the bead cord 10i except the twisting direction. And the twisting direction of the sheath 12 (equivalent to the final twisting direction To) is defined as the "clockwise rotation" (s-twist).

For the bead cords 10i, 10o, when the final twisting directions Ti, To are identified, various twisting structures can be employed such as a bundle-twisting structure (1×n) made by twisting n number of steel wires F, a slash-twisting structure (m/n) made by twisting to have the same twisting direction and the same twisting pitch, and a multi-twisting structure (m×n) made by twisting m number of strands (each strand obtained by first twisting n number of steel wires F), for example.

Figure 7:
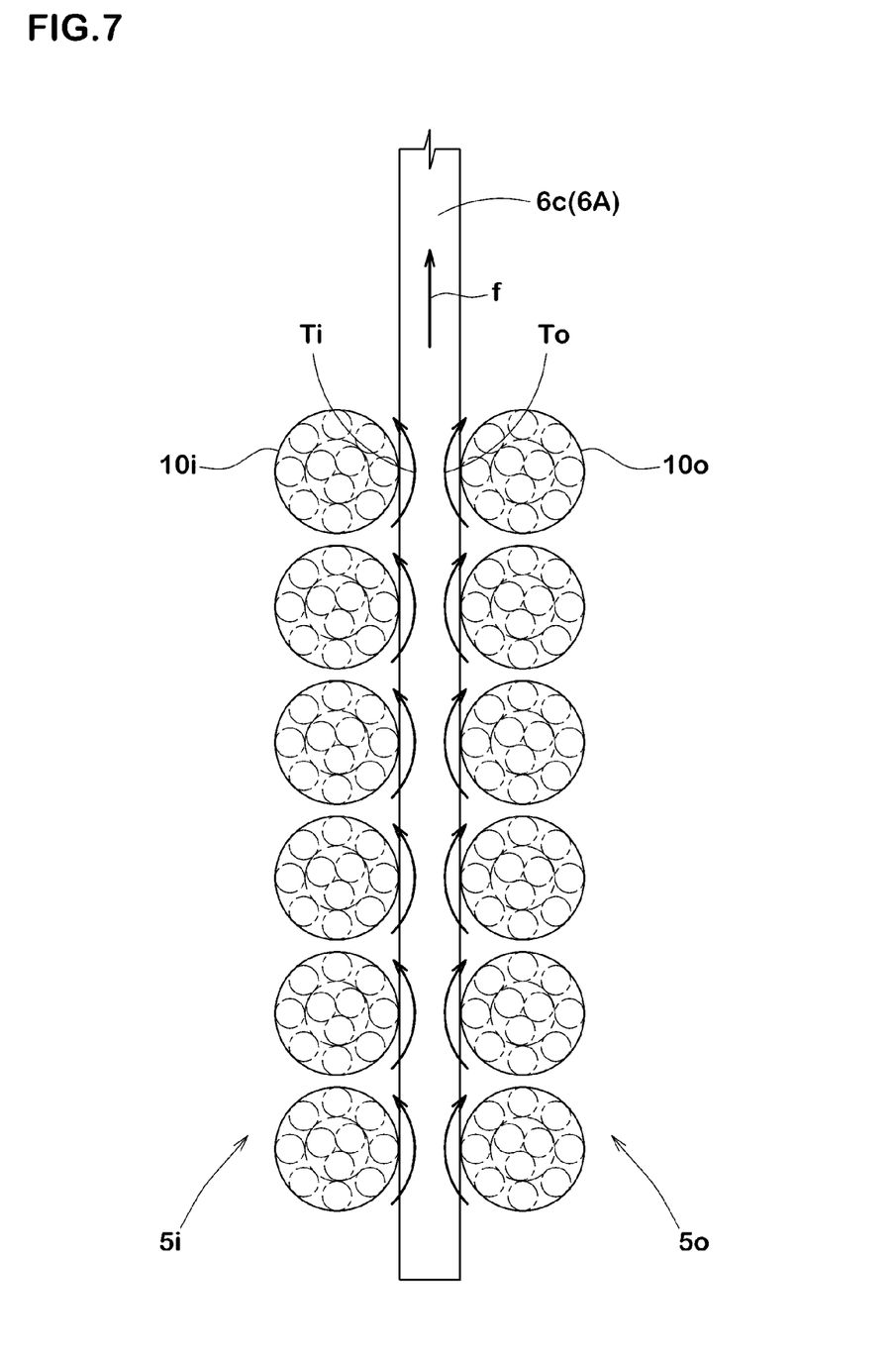
FIG. 7 s a cross-sectional view of the bead core explaining the function effect of the present invention.

To construct as above, as shown in FIG. 7, when heat shrinkage (f) occurs in the carcass cord 6c, the bead cord 10i of the inner core piece 5i and the bead cord 10o of the outer core piece 5o are twisted in a tightening direction of the outermost twisting of the cord, respectively. This allows the binding force to work effectively against the direction of the heat shrinkage (f), and allow to give tensile force to the carcass cord 6c, and to improve the steering stability. such an effect is more produced when the cord has the final twisting pitch of not more than 50 mm.

Incidentally, when the heat shrinkage of the carcass cord 6c itself is too small, it cannot improve the steering stability even if the binding force is improved since the tensile force is not given to the carcass cord 6c. Therefore, in the present invention, the steering stability is more effectively improved when the heat shrinkage of the carcass cord 6c at 180 degrees is preferably not less than 1.5%, more preferably not less than 2.0%. According to "Dry-heat shrinkage after heating (method B)" shown section 8.10 (b) of JIS-L1017, the above-mentioned "heat shrinkage" means a dry-heat shrinkage after heating of the cord for five minutes at 180 degrees C. under no-load.

Naturally, when both of the winding direction Ri of the bead cord 10i in the inner core piece 5i and the winding direction Ro of the bead cord 10o in the outer core piece 5o are "clockwise rotation", the bead cord 10i having the final twisting direction Ti of "clockwise rotation" (s-twist) is employed for the inner core piece 5i. And the bead cord 10o having the final twisting direction To of "counterclockwise rotation" (Z-twist) is employed for the outer core piece 5o.

Figure 8:
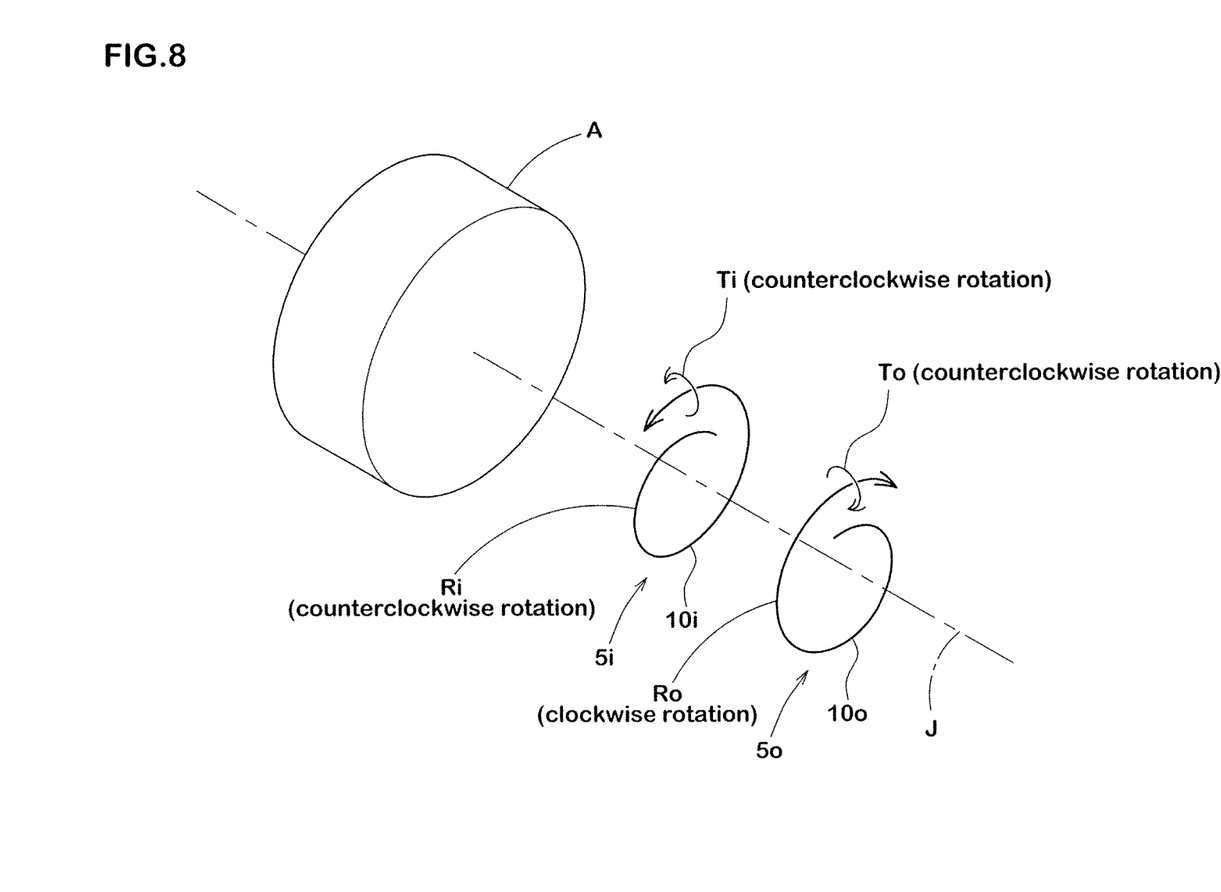
FIG. 8 is a conceptual diagram showing another example of the twisting direction and the winding direction of the bead cords in the inner and outer core pieces.

As conceptually shown in FIG. 8, when the winding direction Ri of the bead cord 10i in the inner core piece 5i is the "counterclockwise rotation" and the winding direction Ro of the bead cord 10o of the outer core piece 5o is the "clockwise rotation", the same cords having the final twisting direction Ti, To of the "counterclockwise rotation" (z-twist) can be employed for the bead cords 10i, 10o, respectively. Meanwhile, when the winding direction Ri of the bead cord 10i in the inner core piece 5i is the "clockwise rotation" and the winding direction Ro of the bead cord 10o in the outer core piece 5o is the "counterclockwise rotation", the same cords having the final twisting directions Ti, To of the "clockwise rotation" (s-twist) can be employed for the head cords 10i, 10o, respectively.

Figure 9A:
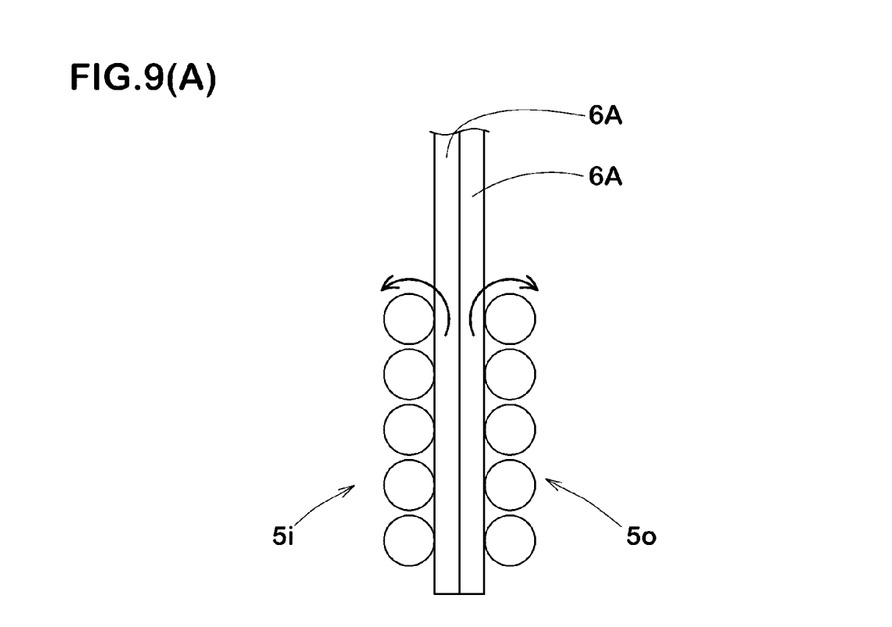
Figure 9B:
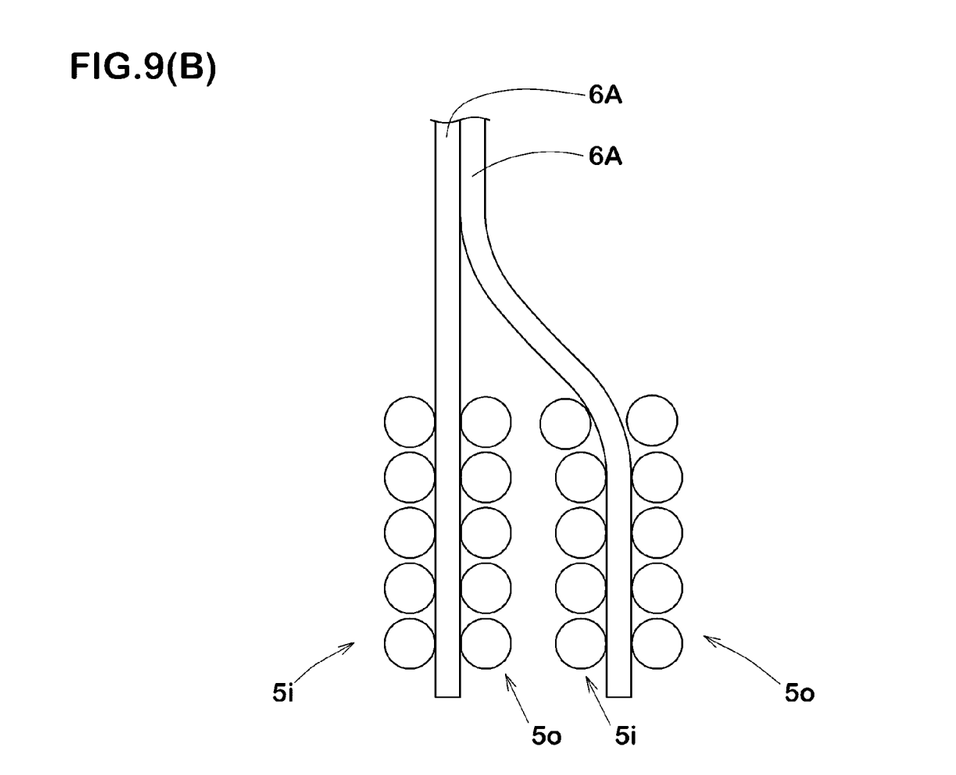

Further, when the number of the carcass ply 6A is plural, two carcass plies 6A for example, as shown in FIG. 9(A), the plurality of carcass plies 6A can be held between the inner and outer core pieces 5i, 5o. However, as shown in FIG. 9(B), it is preferable to provide a plurality of the pairs of inner and outer core pieces 5i, 5o and to hold each of the carcass plies 6A between the respective inner and outer core pieces 5i, 5o so as to improve the binding force.

Next, a method of manufacturing the pneumatic tire 1 will be described in detail. This production method comprises a green tire forming step and a vulcanizing step (shown in FIG. 11 (A)). In the green tire forming step, by use of a rigid core (A) provided with a tire forming surface (As) on an outer surface (shown in FIG. 4), unvulcanized tire components are serially applied on the tire forming surface (As). Thus a green tire (t) is formed. In the vulcanizing step, the green tire (t) is set in a vulcanization mold (b) with the rigid core (A) and vulcanized and formed.

Figure 10A:
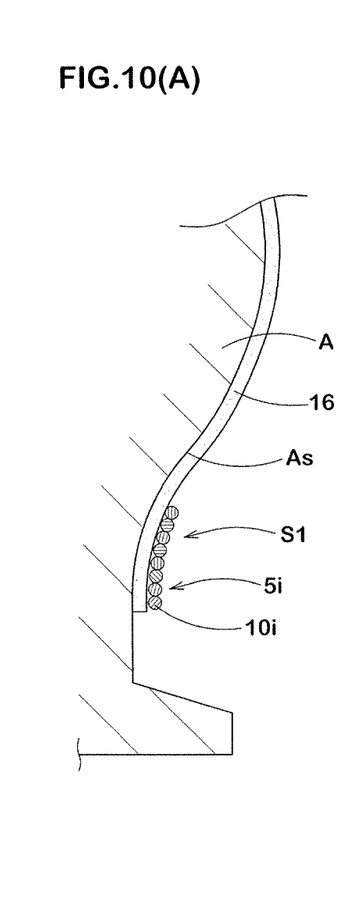
Figures 10B, 10C:
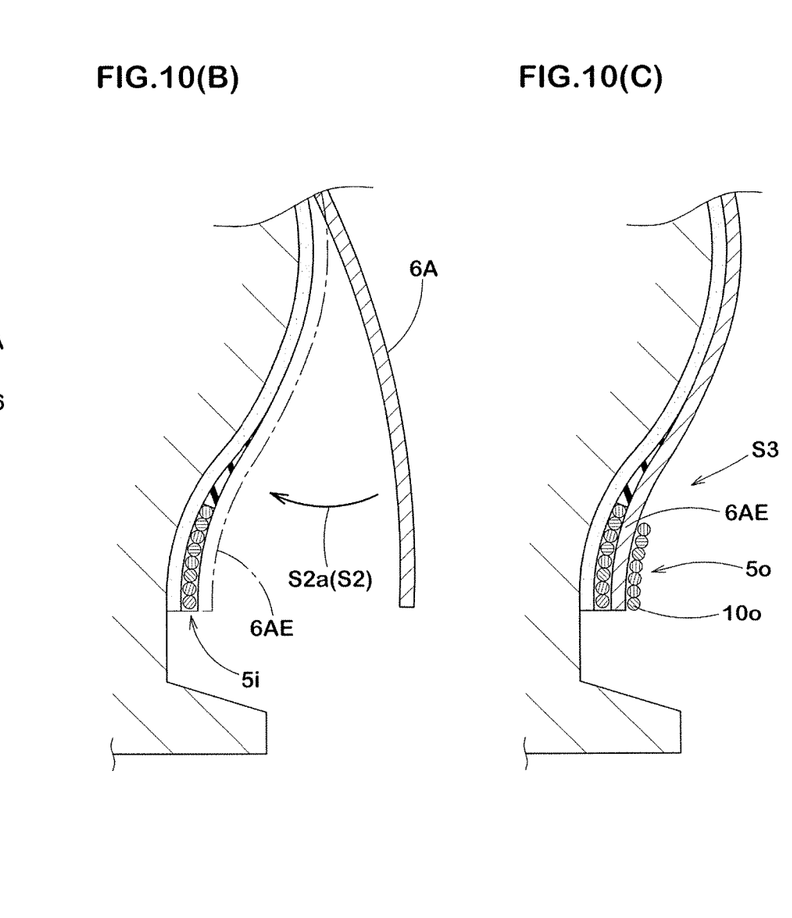

The green tire forming step, as shown in FIGS. 10 (A)-(C), comprises a first core piece step S1, a carcass forming step S2, and a second core piece step S3. In the first core piece step S1, the bead cord 10irubberized with an unvulcanized tire is helically winding from radially inward to outward around the tire axis on the tire forming surface (As) so as to form the inner core piece 5i. The sign 16 means an inner liner rubber.

The carcass forming step s2 comprises a step s2a of applying the radially inner end portion 6AE of the carcass ply 6A to the axially outside surface of the inner core piece 5i.

In the second core piece step s3, axially outward of the radially inner end portion 6AE of the carcass ply 6A, the rubberized bead cord 10o is helically wound around the tire axis from radially inward to outward so as to form the outer core piece 5o.

At this time, as shown in FIGS. 3 and 8, in the first core piece step s1, the final twisting direction Ti of the bead cord 10i has the same direction as the winding direction Ri of the bead cord 10i around the tire axis J in the side view from the axial outward of the tire. In the second core piece step s3, the final twisting direction To of the bead cord 10o has an opposite direction to the winding direction Ro of the bead cord 10o around the tire axis J in the side view from the axial outward of the tire.

The above has described in detail a particularly preferred embodiment of the present invention, the invention is not limited to the embodiment shown, can be implemented by modifying to various aspects.

EXAMPLE

For confirmation of the effects of the present invention, a pneumatic tire (225/40R18) having an inner structure shown in FIG. 1 was made in the core method. The bead structure of each test tire was based on the specifications shown in Table 1. Each test tire was tested in steering stability, and the test results were compared. In each tire, the bead cores on one side and the other side of the tire equator have same structures as shown in Table 1.

The bead cord shown in Table 1 has the same specifications such as a twisting structure (2/7×0.37), diameter of cord of 1.41 mm, and twisting pitch of 50 mm, except the twisting direction. In respect to the carcass cord, cords are PET of 1670/2 dtex, rayon of 1840/2 dtex, aramid of 1100/2 dtex.

Steering Stability:

Under rim (8.5 J) and internal pressure (210 kPa), the test tires were mounted on all four wheels of a vehicle (2000 cc, FR car), and test was conducted on a course in Okayama International Circuit (five laps continuous running) in braking, turning, acceleration, handling, lap time. Evaluation was performed in a professional driver's feeling test and displayed on a scale of one to ten. The larger the numeric values were, the more favorable it was in the steering stability.

TABLE 1

| | Com. Ex. 1 | Com. Ex. 2 | Com. Ex. 3 | Com. Ex. 4 | Com. Ex. 5 | Ex. 1 | Ex. 2 | Ex. 3 | Ex. 4 | Com. Ex. 6 | Com. Ex. 7 | Com. Ex. 8 | Com. Ex. 9 |
|---|---|---|---|---|---|---|---|---|---|---|---|---|---|
| Carcass cord | | | | | | | | | | | | | |
| Material | PET | PET | PET | rayon | aramid | PET | PET | rayon | aramid | PET | PET | rayon | aramid |
| Heat shrinkage | 4.0 | 4.0 | 2.0 | 1.5 | 0.0 | 4.0 | 2.0 | 1.5 | 0.0 | 4.0 | 2.0 | 1.5 | 0.0 |
| Inner core piece | | | | | | | | | | | | | |
| Winding direction of cord | clockwise rotation | | | | | clockwise rotation | | | | clockwise rotation | | | |
| Final twisting direction of cord | clockwise rotation (S-twist) | counter-clockwise rotation (Z-twist) | clockwise rotation (S-twist) | clockwise rotation (S-twist) | clockwise rotation (S-twist) | clockwise rotation (S-twist) | | | | counterclockwise rotation (Z-twist) | | | |
| Outer core piece | | | | | | | | | | | | | |
| Winding direction of cord | clockwise rotation | | | | | clockwise rotation | | | | clockwise rotation | | | |
| Final twisting direction of cord | clockwise rotation (S-twist) | counter-clockwise rotation (Z-twist) | clockwise rotation (S-twist) | clockwise rotation (S-twist) | clockwise rotation (S-twist) | counterclockwise rotation (Z-twist) | | | | clockwise rotation (S-twist) | | | |
| Steering stability | 7 | 7 | 5 | 6 | 5 | 9 | 6 | 7 | 5 | 6.5 | 4.5 | 5.5 | 5 |

Tire of the present embodiment as shown in the table, excellent steering stability was confirmed.

DESCRIPTION OF THE SIGN

1 Pneumatic tire
2 Tread portion
3 Sidewall portion
4 Bead portion
5 Bead core
5i Inner core piece
5o Outer core piece
6 Carcass
6A Carcass ply
6AE Inner end portion
10, 10i, 10o Bead cord
F Steel wire
Ri, Ro Winding direction
S1 First core piece step
S2 Carcass forming step
S3 Second core piece step
Ti, To Twisting direction

The invention claimed is:

1. A pneumatic tire having twisted bead cords comprising a carcass comprising a carcass ply extending from a tread portion through a sidewall portion to a bead core of a bead portion; wherein
the bead core is made of axially inner and outer core pieces, and a radially inner end portion of the carcass ply is held between the inner and outer core pieces without turning-up around the bead core;
the inner and outer core pieces are each formed of a helical body by each helically winding a bead cord made of a plurality of twisted steel wires around a tire axis from radially inward to outward; and
in the inner core piece, a twisting direction of the bead cord around the cord axis is in a direction that is the same as a winding direction of the bead cord around the tire axis in a side view from an axial outward of the tire, and
in the outer core piece, a twisting direction of the bead cord around the cord axis is in a direction that is opposite of a winding direction of the bead cord around the tire axis in a side view from an axial outward of the tire;
wherein a twisting direction of a sheath in the inner core piece around the cord axis and a twisting direction of a sheath in the outer core piece around the cord axis are the same direction.

2. The pneumatic tire as set forth in claim 1, wherein the carcass ply has a carcass cord of which heat shrinkage at 180 degrees C. is not less than 1.5%.

3. A production method for a pneumatic tire comprising a carcass comprising a carcass ply extending from a tread portion through a sidewall portion to a bead core of a bead portion, wherein
the production method comprises a green tire forming step of forming a green tire by use of a rigid core having a tire forming surface on the outer surface by sequentially applying unvulcanized tire components including the bead core and the carcass ply on the tire forming surface;
the green tire forming step comprises
a first core piece step of forming an inner core piece on the tire forming surface by helically winding a bead cord made of a plurality of twisted steel wires around the tire axis from radially inward to outward,
a carcass forming step comprising a step of applying a radially inner end portion of the carcass ply to the axially outside surface of the inner core piece, and
a second core piece step of forming an outer core piece on the axial outward of the tire of the radially inner end portion of the carcass ply by helically winding the bead cord around the tire axis from radially inward to outward; and
in the first core piece step, the final twisting direction of the bead cord is the same direction as the winding direction of the bead cord around the tire axis in a side view from the axial outward of the tire, and in the second core piece step, the final twisting direction of the bead cord is opposite to the winding direction of the bead cord around the tire axis in the side view from the axial outward of the tire; wherein a twisting direction of a sheath in the first core piece around the cord axis and a twisting direction of a sheath in the second core piece around the cord axis are the same direction.

4. The production method for a pneumatic tire as set forth in claim 3, wherein the winding direction of the bead cord in the first core piece step is the same as the winding direction of the bead cord in the second core piece step.

5. The production method for a pneumatic tire as set forth in claim 3, wherein the carcass ply has a carcass cord of which heat shrinkage at 180 degrees C. is not less than 1.5%.

6. The production method for a pneumatic tire as set forth in claim 4, wherein the carcass ply has a carcass cord of which heat shrinkage at 180 degrees C. is not less than 1.5%.

* * * * *